United States Patent
Stöttinger et al.

(10) Patent No.: US 11,550,480 B2
(45) Date of Patent: Jan. 10, 2023

(54) METHOD OF IDENTIFYING ERRORS IN OR MANIPULATIONS OF DATA OR SOFTWARE STORED IN A DEVICE

(71) Applicant: Continental Teves AG & Co. OHG, Frankfurt am Main (DE)

(72) Inventors: Marc Sebastian Patric Stöttinger, Schwalbach a (DE); Abhijit Ambekar, Schwalbach a (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 30 days.

(21) Appl. No.: 16/922,256

(22) Filed: Jul. 7, 2020

(65) Prior Publication Data
US 2021/0011632 A1  Jan. 14, 2021

(30) Foreign Application Priority Data
Jul. 8, 2019 (EP) .................................... 19185022

(51) Int. Cl.
G06F 12/00 (2006.01)
G06F 13/00 (2006.01)
G06F 3/06 (2006.01)
G06F 16/901 (2019.01)
H04L 9/32 (2006.01)

(52) U.S. Cl.
CPC ............ G06F 3/0619 (2013.01); G06F 3/064 (2013.01); G06F 16/9014 (2019.01); H04L 9/3236 (2013.01); G06F 3/0679 (2013.01)

(58) Field of Classification Search
CPC ...... G06F 3/0619; G06F 3/064; G06F 3/0679; G06F 16/9014; H04L 9/3236
USPC ......................................................... 711/154
See application file for complete search history.

(56) References Cited

U.S. PATENT DOCUMENTS

| 5,371,499 A * | 12/1994 | Graybill | ............... H03M 7/3086 341/51 |
| 5,390,173 A * | 2/1995 | Spinney | .................. H04L 12/46 370/401 |
| 5,414,704 A * | 5/1995 | Spinney | .............. H04L 45/7453 711/216 |
| 5,446,747 A | 8/1995 | Berrou | |

(Continued)

OTHER PUBLICATIONS

Search Report of corresponding European Patent Application No. 19185022.1.

(Continued)

*Primary Examiner* — Sheng Jen Tsai
(74) *Attorney, Agent, or Firm* — Cozen O'Connor

(57) ABSTRACT

A method of identifying errors or manipulations of data or software, includes receiving a first hash value stored in a first block of the memory, receiving a second hash value from a reference memory, and comparing the hash values. If different, error correction information and the content of the first block is received. The content of the first block is reconstructed by in accordance with the error correction information, generating a hash value and comparing the hash value of the modified content with the received first hash value, until the modified content and the received hash values are identical. The content of the first block received from the reference memory and the content of the reconstructed first block stored in the memory of the device are compared for identifying the differences in the content.

15 Claims, 2 Drawing Sheets

(56) References Cited

U.S. PATENT DOCUMENTS

| | | | | |
|---|---|---|---|---|
| 5,448,641 | A * | 9/1995 | Pintsov | G07B 17/00733 380/43 |
| 7,747,584 | B1 * | 6/2010 | Jernigan, IV | G06F 16/1748 711/112 |
| 8,204,871 | B1 * | 6/2012 | Pawar | G06F 16/172 707/711 |
| 8,560,503 | B1 * | 10/2013 | McManis | G06F 16/00 707/812 |
| 8,782,435 | B1 * | 7/2014 | Ghose | G06F 21/52 712/216 |
| 10,630,702 | B1 * | 4/2020 | Irwan | H04L 63/1416 |
| 2006/0288177 | A1 | 12/2006 | Shaw | |
| 2007/0150596 | A1 * | 6/2007 | Miller | G06F 21/10 709/226 |
| 2009/0305680 | A1 * | 12/2009 | Swift | H04L 43/00 455/414.1 |
| 2010/0031000 | A1 * | 2/2010 | Flynn | G06F 16/9014 711/216 |
| 2010/0185680 | A1 * | 7/2010 | Gilboa | H04L 63/1441 707/802 |
| 2011/0185417 | A1 * | 7/2011 | Zhou | G06F 21/566 726/22 |
| 2011/0208979 | A1 * | 8/2011 | Saarinehn | H04L 9/0643 713/193 |
| 2011/0283110 | A1 * | 11/2011 | Dapkus | H04L 9/3234 713/182 |
| 2013/0047233 | A1 * | 2/2013 | Fisk | H04L 63/18 726/7 |
| 2013/0290655 | A1 * | 10/2013 | Fang | G06F 16/2379 711/E12.001 |
| 2014/0082264 | A1 * | 3/2014 | Wan | G06F 11/1012 711/103 |
| 2014/0181575 | A1 * | 6/2014 | Kalach | G06F 11/1415 714/6.11 |
| 2014/0281354 | A1 * | 9/2014 | Tkacik | G06F 12/1009 711/206 |
| 2014/0317479 | A1 * | 10/2014 | Candelaria | G06F 11/0763 714/807 |
| 2015/0188715 | A1 * | 7/2015 | Castellucci | H04L 9/3265 713/178 |
| 2015/0280736 | A1 * | 10/2015 | Ogasawara | H03M 7/3084 341/51 |
| 2016/0028552 | A1 * | 1/2016 | Spanos | H04L 9/3297 713/178 |
| 2016/0204942 | A1 * | 7/2016 | Bohli | H04L 9/3236 713/168 |
| 2016/0277733 | A1 * | 9/2016 | Li | H04N 19/96 |
| 2016/0277761 | A1 * | 9/2016 | Li | H04N 19/126 |
| 2016/0283920 | A1 * | 9/2016 | Fisher | G06Q 20/065 |
| 2016/0335154 | A1 * | 11/2016 | Zhong | H04L 9/0643 |
| 2016/0366109 | A1 * | 12/2016 | Lablans | G06Q 20/401 |
| 2017/0038978 | A1 * | 2/2017 | Li | G06F 3/0611 |
| 2017/0115889 | A1 * | 4/2017 | Chen | G06F 3/0641 |
| 2017/0286003 | A1 * | 10/2017 | Sala | G06F 3/065 |
| 2017/0286004 | A1 * | 10/2017 | Hu | G11C 29/74 |
| 2017/0286005 | A1 * | 10/2017 | Sala | G06F 12/0864 |
| 2017/0300713 | A1 * | 10/2017 | Fan | H04L 63/0435 |
| 2017/0329635 | A1 * | 11/2017 | Rathke | G06F 9/5077 |
| 2017/0344435 | A1 * | 11/2017 | Davis | G06F 16/2365 |
| 2017/0344457 | A1 * | 11/2017 | Davis | G06Q 20/10 |
| 2017/0357232 | A1 * | 12/2017 | Nikhra | G05B 19/0428 |
| 2018/0039538 | A1 | 2/2018 | Freikorn et al. | |
| 2018/0081717 | A1 * | 3/2018 | Li | G06F 9/4881 |
| 2018/0082043 | A1 * | 3/2018 | Witchey | G16H 10/40 |
| 2018/0095985 | A1 * | 4/2018 | Zhang | G06F 3/0688 |
| 2018/0189132 | A1 * | 7/2018 | Malladi | G06F 11/1012 |
| 2018/0205552 | A1 * | 7/2018 | Struttmann | G06F 21/78 |
| 2019/0057379 | A1 * | 2/2019 | Chalakudi | H04L 63/0823 |
| 2019/0079875 | A1 * | 3/2019 | Graham | G06F 9/4408 |
| 2019/0114182 | A1 * | 4/2019 | Chalakudi | H04L 9/0618 |
| 2019/0116142 | A1 * | 4/2019 | Chalakudi | H04L 67/20 |
| 2019/0190698 | A1 * | 6/2019 | Nuzzi | G06F 16/58 |
| 2019/0205219 | A1 * | 7/2019 | Graham | G06F 21/64 |
| 2019/0370114 | A1 * | 12/2019 | Troia | H04L 9/3247 |
| 2020/0142588 | A1 * | 5/2020 | Meiri | H04L 9/0643 |
| 2020/0195789 | A1 * | 6/2020 | Takahashi | H04N 1/00244 |
| 2020/0244442 | A1 * | 7/2020 | Zeh | H04L 9/0662 |
| 2020/0265352 | A1 * | 8/2020 | Haimes | G06Q 20/02 |
| 2020/0372003 | A1 * | 11/2020 | Boelderl-Ermel | H04L 9/3239 |
| 2020/0372031 | A1 * | 11/2020 | Ruehle | G16B 30/10 |
| 2020/0372980 | A1 * | 11/2020 | de Vries | G16H 40/20 |
| 2021/0075623 | A1 * | 3/2021 | Petersen | H04L 9/3247 |

OTHER PUBLICATIONS

Berrou et al., "Near Shannon Limit Error-Correcting Coding and Decoding: Turbo-Codes (1)," 1993, pp. 1066-1070.

Milburn et al., "Efficient Reverse Engineering of Automotive Firmware," 2018, pp. 1-7.

* cited by examiner

METHOD OF IDENTIFYING ERRORS IN OR MANIPULATIONS OF DATA OR SOFTWARE STORED IN A DEVICE

BACKGROUND OF INVENTION

1. Field of the Invention

The present disclosure generally relates to a method of identifying errors in or manipulations of data or software stored in a device, e.g., firmware of a device. In particular, the present disclosure relates to a method of identifying errors in or manipulations of data or software stored in a device that facilitates identification of errors in or changes of the data or software without receiving any form of intelligible data or computer executable code or source code from the device.

2. Description of Related Art

Many of today's devices are controlled by some form of software or firmware. In addition, many of today's devices provide some form of connectivity, wired or wireless, for receiving and/or transmitting data. Receiving and transmitting data may occur during normal operation of the devices, but may also be used for performing diagnostics on the devices, debugging, and/or updating the software.

An exemplary environment in which a plurality of devices, or engine control units (ECUs), are communicatively connected for implementing and providing various functions is a modern motor vehicle. A first ECU in a motor vehicle may control one or more of a plurality of safety or security functions of the vehicle, while a second ECU may control one or more other functions in the vehicle. Any ECU may receive information from one or more other ECUs that is required for properly executing the function. For example, the actual opening or locking the doors of the vehicle may be controlled by the first ECU, but a remote-control signal from the driver's key fob may be received from the second ECU, which transmits the information to the first ECU via a communication network provided in the vehicle. Common communication networks used in vehicles include a "Local Interconnect Network" (LIN), which is a low-cost serial network protocol used for communication between components in vehicles for which the "Controller Area Network" (CAN), a message-based protocol network that does not require a dedicated host computer, is too complex and expensive. Other common vehicle networks include, inter alia, "Media Oriented Systems Transport" (MOST), a high-speed serial multimedia network technology providing synchronous data communication to transport audio, video, voice and data signals via optical fibre and electrical conductor physical layers, and FlexRay, an automotive network communications protocol designed to govern on-board automotive computing which is faster than CAN, but is also more expensive. Which of the various types of networks is used in a vehicle depends on the respective requirements, and combinations of different types of networks may be found in one vehicle, often communicatively connected via one or more gateway devices.

During development and for analysing the functioning and communication of the connected system components some way for accessing an ECU must be provided. This access may be provided through a testing device that is connected to the network for monitoring (listening) and recording (tracing) network communication. Some testing devices may also send information, e.g., for simulating ECUs that are currently not available in the system. Moreover, testing devices may have read access to memory spaces in ECUs that store errors, can clear errors from those memory spaces, can write new parametrization data or software to ECUs or read such data therefrom, or initiate special control routines in ECUs. Testing devices typically use a diagnostic protocol provided for the in-vehicle network, which stipulates commands and actions that can be sent and executed.

A common diagnostic protocol is "Unified Diagnostic Services" (UDS), which is stipulated in ISO 14229-1 for road vehicles, and which has a specific application on in-vehicle CAN that is specified in ISO 15765-3. UDS includes 25 diagnostic services that the testing device can transmit to one or more ECUs. A diagnostic service includes a request from the testing device and at least one response from one of the ECUs. Each diagnostic service is assigned a unique service identifier (SID). Request and response messages carry corresponding SIDs. In UDS the response SID corresponds to the request SID to which the value 0x40h is added. Responses and requests may include parameters that specify the respective diagnostic service in greater detail.

Exemplary diagnostic services defined in UDS include requests to

| | |
|---|---|
| ReadDataByIdentifier | (request SID $22) |
| ReadMemoryByAddress | (request SID $23) |
| WriteDataByIdentifier | (request SID $2E) |
| WriteMemoryByAddress | (request SID $3D) |
| RequestDownload | (request SID $34) |
| RequestUpload | (request SID $35) | any of which may be used for gaining deep and uncontrolled access to ECU data, parameters and/or software, including downloading the entire memory content for reverse engineering or manipulating the data, parameters and/or software.

Software in ECUs, together with other data or parameters, often controls safety-critical functions of a device or system, or ensures that a device is operated within its safe operating limits. These are particular important aspects in those cases, in which devices or systems need to comply with legal regulatory requirements, e.g., as a prerequisite for public sale and use thereof, like in many automotive applications, aerospace, medical devices and the like. Also, software, data or parameters may represent intellectual property, which manufacturers may wish to protect from copying.

There is thus a general need for preventing unauthorized or illegal access to software, data or parameters that is stored in a vehicle's ECUs or, more generally, in any electronic device that can be accessed for reading or writing software, data or parameters.

One key element for preventing illegal access to or tampering with software in devices is preventing access to the device or to interfaces of the device, or at least preventing access to specific parts of the device memory storing software, data or parameters, irrespective of their respective representation. In this context representations of software may include any kind of computer-readable and computer-executable instructions, such as binary code or instructions for interpreted languages, or source code, or any other representation that allows reverse engineering of the functioning of the software, irrespective of the effort required for reverse engineering.

While completely disabling reading of software, data or parameters may appear a straightforward solution, this would also prevent any kind of legitimate read access, which is clearly not desirable. Authorized persons will need unrestricted read access to software and data of a device, for updating, analysing, testing and a plethora of other legitimate purposes.

To provide legitimate access to software stored in devices, access control mechanisms for providing access only for authorized persons are commonly used. Such access control mechanisms may include the use of proprietary physical interfaces, e.g., interfaces operating at not commonly used signal levels, speeds, etc., but may also include using a physical interface that corresponds to a common standard, where access control is implemented other ways. These other ways may include specific protocols, authentication, authorization, etc.

All of these common methods for providing selective access have in common that, once access is granted, the data can be read out in plain, i.e. any user who has obtained access to the system or an ECU thereof is free to store, copy, or distribute whatever data has been read from the device, possibly including parametrization data and software. While distribution of keys, codes, or other information required for obtaining read access to a device may be controlled, it is extremely unlikely that such information will always be under full control of a manufacturer or an authority. Also, if a large number of ECUs or systems is deployed, securing each one thereof individually by using unique access credentials will quickly turn into an uncontrollable situation, in which access data will be lost, confused, or otherwise unusable.

Also, even when authentication and authorization mechanisms are in place, such protection may be disabled by specific attacks that exploit vulnerabilities in respective implementations of the protection measures. One example for such attack uses dynamic analysis of system behaviour in connection with fault-injection. This type of analysis includes emulating a system component that communicates with a system that is to be reverse engineered, and that sends and receives a large variety of different data and commands to and from, respectively, the ECU that is to be attacked, using the generally known communication protocols, in particular diagnostic protocols. If access to a memory interface is available, it is possible to find out which part of a firmware is responsible for handling specific tasks, and which regions of memory store relevant data. Dynamic analysis may be used by an attacker to emulate the behaviour of a software, in particular in those situations in which authentication or authorization processes are executed. Once a protection mechanism built into an ECU is identified and defeated, the attacker has full access to the system and likely to identical or similar systems, and can use all kinds of tools to download or upload software and data.

SUMMARY OF THE INVENTION

It is, therefore, desirable to provide an improved protection against unauthorised access to data, parameters, and/or software stored in devices. In particular, it is desirable to provide such improved protection without limiting legitimate access to usable and useful information about such data and/or software that is retrieved directly from such devices. In the context of this disclosure the terms software, data and parameters may be used interchangeably.

In accordance with a first aspect of the present disclosure a computer-implemented method of identifying errors in or manipulation of data or software of a device is provided.

A method in accordance with one aspect includes receiving a first hash value of data or software stored in a first block of the memory of the device, and a second hash value of the data or software in the first block from a reference memory. Receiving the second hash value may include receiving the content of the first block from the reference memory, and determining the second hash value thereof.

A hash value, also referred to as hash code, digest, or hash, is the output of a mathematical function that can be used to map input data on output data, typically mapping input data of arbitrary size to output data of a fixed size. A particularly useful version of the hash function is the cryptographic hash function, which is a deterministic one-way function, i.e., a function that invariably produces the same output for the same input and is practically infeasible to invert. A cryptographic hash function allows one to easily verify whether some input data exactly map onto a given hash value, but if the input data is unknown it is deliberately difficult to reconstruct it, or any equivalent alternatives, by just by knowing the stored hash value. Also, cryptographic hash functions will not produce the same output for different input, and a small change in the input data will result in a large change in the corresponding output value so that the two hash values appear uncorrelated.

The first block of the memory of the device may refer to any length of data stored in that memory, e.g., identified by a start address and an end address or a length of data in that memory. A reference copy of the first block of the memory of the device is stored in the reference memory, which is separate from the device, and preferably accessible only after proper authentication and/or authorisation. The data or software is stored in the reference memory in such a way that the same data is found at the same address. In other words, if the data or software stored in the device memory is unchanged over its initial or reference state, read requests to any block of data or software in the memory of the device and to the same block of data or software in the reference memory will return the same data or software.

The method further includes comparing the first and the second hash values.

In case the first and the second hash value are identical, it can be assumed with reasonable certainty that the data that was hashed is likewise identical. Further in this case, the method may repeat the steps for a different block of the memory, generate and output a first signal indicating the identity of the data or software stored in the first block of the memory of the device and the data or software stored in the first block of the reference memory, e.g., for documentation or information, and/or terminate.

In case the first and the second hash value are not identical, the method may generate and output a second signal, indicating the non-identity of the data or software stored in the first block of the memory of the device and the data or software stored in the first block of the reference memory, again e.g., for documentation or information, and/ or may terminate. However, the method may also continue and further include receiving error correction information for the first block stored in the memory of the device, and receiving the content of the first block from the reference memory, if the content has not already been received for determining the second hash value. As the error correction information may have been received together with the first hash value, receiving the error correction information includes extracting it from the received data. The content of the first block from the reference memory and the error correction information is then used for reconstructing the content of the first block stored in the memory of the device. Reconstructing includes iteratively, i.e., repeatedly, applying small changes over a previous iteration, modifying the content of the first block received from the reference memory in accordance with the received error correction information, generating a corresponding hash value of the modified content, and comparing the hash value of the modified content with the received first hash value.

Once the modified reference block produces the same hash value as the received first hash value, the content of the modified reference block, which beyond reasonable doubt corresponds to the content of the block stored in the memory of the device, and the content of the reference block are compared, for identifying the differences in the content.

As was elucidated further above, it is almost impossible to compose a set of data that will produce the same hash value if the only information available is the hash value. However, in one or more embodiments the error correction information pertaining to the modified content of the block presently stored in the device may be used for identifying those parts of the reference content of the block that are likely unchanged and those that are likely to have been modified. This may reduce the number of iterations required for reconstructing by focusing only on memory locations that are different, as opposed to a so-called "brute-force" approach, which essentially is trying all possible modifications for the entire block until one eventually produces the desired result.

According to one aspect of the invention, the error correction may correspond to error correction information as found in so-called Turbo codes. Turbo codes belong to a class of convolutional codes exhibiting a performance in terms of Bit Error Rate (BER) that is close to the Shannon limit. Turbo codes are used for encoding and decoding streams of symbols. The Turbo encoder produces an output stream having random-like properties, and the Turbo decoder runs a received Turbo-coded symbol stream through a sequence of decoders, feeding back the output of the last decoder to the first decoder for recursive improvement of the decoding result. Decisions on the probability that a decoder output is correct may be made using Maximum A Posteriori (MAP) algorithm, or developments thereof, including versions that operate in the log domain, e.g. Log-MAP or Max-Log-MAP, or the like.

On a binary or symbol level the block requested in the read request, or parts thereof, like for example rows or columns, may be considered a stream of symbols. If such stream of symbols is coded using Turbo codes and only the resulting error correction information is provided by the device in response to a request, such error correction information alone will not suffice for reconstructing the original information that is stored in the device's memory. However, the error correction information may be used for determining the difference between a stream of symbols representing the block in the device's memory and a corresponding stream of symbols from the reference block, helping reconstructing the block present in the device memory.

In one or more embodiments of the method receiving first data includes establishing a communication with a communication interface of the device and transmitting a read request specifying the first block to said communication interface. The request may be targeted to return the content of the first block, i.e., the request message need not be a specific message that is explicitly targeted to receive a hash value of the requested memory block. This avoids having to add according messages to existing protocols and to update devices that may be deployed in large numbers and thus helps maintaining backward compatibility.

Similarly, in one or more embodiments of the method receiving second data includes establishing a communication with a communication interface of a database, separate from the device and transmitting a read request specifying the first block to said communication interface, targeted to return the content of the first block or the corresponding second data.

In one or more embodiments of the method the actual content of the first block is received from the reference memory only after sending valid authentication and/or authorization information to an access control entity associated with the reference memory. The access control entity may be configured to generally control access to the database, but may also be configured to require different access credentials for requests to the hash value and to the actual content of the block from the reference memory. The access control entity may be implemented anywhere in the communication connection established for obtaining data from the reference memory and may be of conventional design.

In one or more embodiments of the method the iterative modification of the content of the first block received from the reference memory is performed not only in accordance with the corresponding error correction information, but also takes known patterns or properties of the content of the block into consideration. Known patterns are, for example, found in computer program instructions of software, and limiting the modification of the content to known codes of a specific platform or architecture may reduce the total number of useful modifications.

In one or more embodiments of the method, in case the first block contains computer program instructions, e.g., of software for controlling the device, the method further includes decompiling the reconstructed first block stored in the memory of the device, for obtaining a human-intelligible representation of the computer program instructions.

In one or more embodiments of the method, when non-identity of a block of memory of the device and the same block from the reference memory had been found, the begin address and/or the end address of the block may be modified, e.g., shifted to a lower or a higher value, for pinpointing or isolating an address range in the memory of the device that is different from the corresponding address range in the reference memory. Once the exact address range is found it may be possible to tell which function of a software stored in the memory has been modified, which may facilitate further analysis and reconstruction. This embodiment may also speed up the entire analysis, since the calculation of hash values is generally fast and requires little computational resources.

In accordance with a second aspect a device is provided, which is adapted to receive, via a communication interface and from an external entity that is not part of the device, a read request specifying a block of the memory of the device. The device is further adapted to return a hash value of the content of the specified block in response to the request. The memory of the device may be of the non-volatile type and store data, e.g., parameters, and/or software used or executed by a microprocessor of the device for controlling the operation of the device. The communication interface may comprise a dedicated controller for handling external requests to the memory in the aforementioned way. Alternatively, the microprocessor of the device may include computer program instructions to intercept external read requests to the memory and to return hash values instead of the actual content. Read requests to the memory that are internal to the device may return the actual content. The communication interface may be an interface that is used during normal operation and for diagnostic communication, or an interface that is exclusively used for diagnostic purposes. Multiple physical and/or logical communication interfaces may be provided in the device.

In one or more embodiments the device is further adapted to return, in response to a corresponding read request specifying a block of memory of the device, error correction information for the content of said specified memory block. Such error correction information may include, but is not limited to, parity bits. The error correction information may be calculated by the microprocessor of the device, or may be output by a specific component provided in the device for this purpose. The corresponding read request may be a read request specifically requesting the error correction information, but may also a read request that is targeted to obtain content from a specified memory block. In the latter case the device's response to the read request may include the hash value and the error correction information.

In one or more embodiments the device may return hash values of content of memory blocks only for specific, restricted memory ranges. A memory block specified in a read request may first be analysed whether any memory address comprised in that block lies in a restricted memory range, before serving the request. Restricted memory blocks or their respective addresses may be identified or flagged in a list stored in the device's memory. Requests to memory blocks that do not lie in restricted memory ranges may be served conventionally by returning the content of the requested block.

In one or more embodiments the device may include access control elements that establish a communication connection or serve a request only after proper authentication and/or authorisation.

In accordance with a third aspect a database system is provided, which has read access to a data storage storing a reference copy of data or software stored in a memory of a device in accordance with the second aspect presented above. The database system has a communication interface that is configured to receive a first or a second read request specifying a block from the reference copy of the memory of a device. The first and second read requests may also specify a device type and/or version, including a device's software version, e.g., in case the database stores reference copies of data or software stored in the memories of a plurality of different devices or versions thereof. The database system may further be configured to return, in response to the first read request, hash values of the content of the specified block and, in response to the second read request, the content of the specified block.

The database system may further be configured to require an authentication and/or authorisation for each read request or for a number of read requests, or for each communication connection established via the communication interface. Corresponding access control elements may be provided in the database system. The database system may thus be configured to return the hash value of the specified block only after a positive first authentication and/or first authorisation of the requesting entity, and to return the content of the specified block only after a positive second authentication and/or second authorisation of the requesting entity. The first and second authentication or authorisation may also be used for distinguishing first and second read requests, which may otherwise have the same format, and consequently for determining what is returned in response to the read request.

The first and second authentication or authorisation may implement different security levels and may each invoke different other functions, e.g., a transport encryption of the content of the specified block or the like, allowing, inter alia, for a content-related adaptation of the workload.

The database system may be configured to store the reference copy of data or software stored in a memory of a device in a way that a block specified in the read request to the database comprises the same data as the corresponding block in the memory of the device, if the reference copy and the copy stored in the device are identical. This may include, inter alia, providing a look up table in the database, that is configured to map the block specified in the request, e.g., by a begin address and an end address or length of data to be read, to the appropriate memory location of the database. Generally speaking, the database stores reference copies of memory content of devices as well as information pertaining to their respective organisation in the memory of the respective devices.

In accordance with a fourth aspect a computer system, or data processing apparatus, configured to identify errors in or manipulations of data or software used or executed by a microprocessor for controlling a device is provided. The data processing apparatus is configured for communicatively connecting with a device according to the second aspect disclosed further above and with a database system according to the third aspect disclosed further above. The data processing apparatus is further configured to execute the method according to the first aspect described further above.

The communication connection between the data processing apparatus and the database may, e.g., include a local or wide area network connection (LAN, WAN), wired or wireless, in accordance with common standards. The database may also be part of the device and thus be connected via an internal data communication interface. The communication connection between the data processing apparatus and the device may include a local connection, wired or wireless, e.g., with a debug interface of a system or system component or a data bus that interconnects system components. Such debug access may be implemented in CAN-Bus environments via an On-Board Diagnostics Interface (OBD), either directly or via system components acting as gateway devices. Other debug interfaces found on a system component level may include JTAG, named after the Joint Test Action Group which codified it, or the like.

The data processing apparatus is, thus, configured to request and receive, from a device it is communicatively connected to, a first hash value of data or software stored in a first block of the memory of the device, irrespective of whether the request was targeted to the hash value or the content of the block. The data processing apparatus is further configured to request and receive, from a database system it is communicatively connected to and that stores a reference copy of the device memory, a second hash value of the data or software in the first block or the content of the first block, for calculating the hash value by the data processing apparatus. The data processing apparatus is yet further configured to compare the first and the hash values. The data processing apparatus may be configured to repeat the procedure for further blocks, if the comparison indicates that the hash values are identical, or to terminate, optionally after outputting a corresponding first signal indicating the identity of the content of the blocks in the device and the reference memory represented by their hash values. In case the comparison indicates that the content of the blocks represented by their respective hash values is not identical the data processing apparatus may generate and output a corresponding second signal indicative of this fact and is further configured to request and receive, from the device, error correction information for the first block stored in the memory of the device, if such information had not already been received along with the hash value. The data processing apparatus is further configured to receive, from the database, the content of the first block obtained from the reference copy stored in the database, if the content had not already been received for calculating the second hash value, and to reconstruct the content of the first block stored in the memory of the device by iteratively modifying the reference content of the first block received from the database in accordance with the error correction information, generating a hash value of the modified content and comparing the hash value of the modified content with the first hash value received from the device. The iteration is repeated until the hash value of the modified content and the received first hash value are identical. Once the content of the first block has been reconstructed its content is compared with the content of the reference block, for identifying the differences in the content.

The computer system may further be configured to decompile a reconstructed first block stored in the device memory if the block contains computer program instructions, for obtaining a human-intelligible representation thereof.

While still permitting identifying changes to or manipulation of data or software stored in a memory of a device, the device according to the second aspect presented hereinbefore may also help preventing reverse engineering data or software from memory dumps obtained through diagnostic or other interfaces, because any read access to a memory block of the device may only return a hash value of its content, not the content itself. Thus, no useful information from the memory that can be translated into the original data or software is ever output via the diagnostic or other interfaces, even if an attacker has gotten past access control means that may nevertheless be present in the device.

Consequently, as long as the reference copies are not made available to the public, e.g., through implementing appropriate security measures controlling access to the database and/or encryption of the communication between the data processing apparatus and the database, any form of well-known and established methods of reverse engineering is futile.

In connection with the apparatus in accordance with the fourth aspect that executes the method in accordance with the first aspect, and the database in accordance with the third aspect, it is still possible to use the—apparently useless—information output from a device in response to read requests for debugging or field return analysis, if the reference copy of the memory of the device is available. Thus, access to the database storing the reference copies of the devices' memories may still need to be controlled by appropriate means. However, since the reference copy of the memory of the device is stored in smaller number of databases than the number of deployed devices, and the databases may be protected by stronger access control mechanisms, which also can be updated more easily than the deployed devices, the number of possible attack points is largely reduced and attacks may be more difficult.

The methods and devices presented hereinbefore may be advantageously used in any system in which a device has an interface of any kind that could be used for accessing content of a memory, including systems in motor vehicles, aircrafts, medical systems, IoT-devices, consumer electronics devices, and the like.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' or 'microprocessor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE DRAWINGS

In the following section the present invention will be described with reference to the drawing, in which.

DETAILED DESCRIPTION OF THE PRESENTLY PREFERRED EMBODIMENTS

Figure 1:
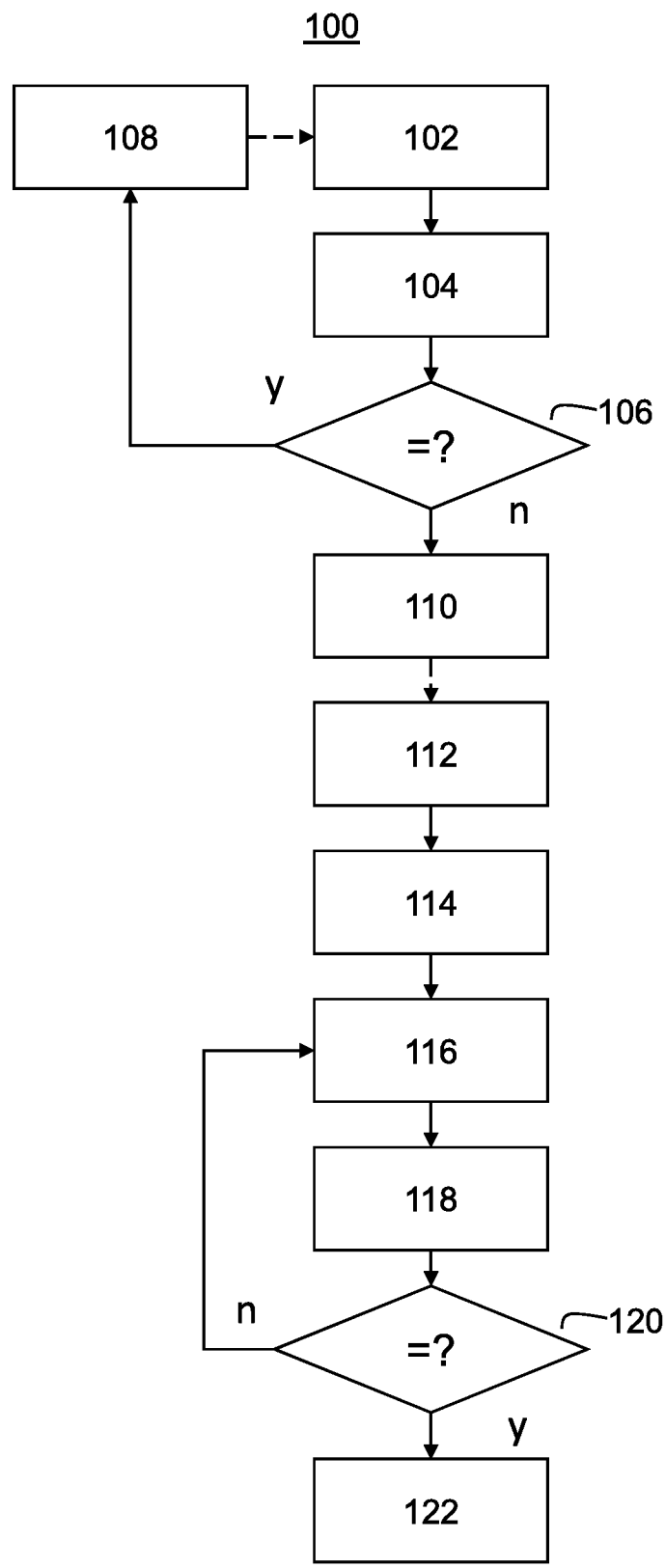
FIG. 1 is a flow chart of an embodiment of the inventive method.

FIG. 1 shows a flow chart of an embodiment of the inventive method 100 in accordance with the first aspect. It is assumed that a user supervising and using a system adapted to perform the method has obtained access to a device, e.g. via a debug port or interface, and a database (not shown in the figure) using valid authorisation and/or authentication, and can now read out the firmware or other memory information from the ROM, RAM or CPU register in a certain block width by transmitting a corresponding read request specifying the block (not shown in the figure).

In step 102 a hash value, or digest, of the specified block is received, from the device, at the system performing the method. The hash value provided in response to the request may be complemented by error correction information, e.g., parity bits, of the requested block. However, the error correction information may also be provided and received in response to a specific, dedicated request. In either case the size of the data block received in response to the request corresponds to the size of the requested block, e.g., for maintaining compatibility with systems that verify the size of the data returned in response to a read request. In step 104 the system receives, from the database, a corresponding hash value of the requested block from the reference copy of the device memory stored in the database. Here again, the hash value may or may not be complemented by error correction information, depending on the configuration of the device. In step 106 of the method the two received hash values are compared. If they are identical the method follows the "yes-branch" of step 106 and output a signal indicating identity of the blocks, step 108, and may repeat the process with a different block, dashed arrow going back to step 102, or simply terminate. If the received hash values are different the method follows the "no-branch" of step 106 and may output a corresponding signal in step 110. In step 112 error correction information for the is received from the device, if such information was not already provided in the received block that contained the hash value. In step 114 a reference copy of the specified block is received from the database. The reference copy corresponds to the actual content of the block rather than the hash value. In step 116 the reference content is modified, and in step 118 a hash value of the modified block is calculated. In step 120 the hash value of the modified block and the hash value received from the device are compared. If the two hash values are identical the modified reference content corresponds to the actual content of the block in the device's memory, and the method may continue along the "yes-branch". Step 122 may include comparing the reconstructed block and the reference block, for identifying the differences therein, and/or may include further processing of the reconstructed block, e.g., decompiling program instructions contained in the reconstructed block or the like. If the two hash values are found not to be identical in step 120 the method follows the "no-branch", returning to step 116 for repeating the modification and calculation of the hash value.

Figure 2:
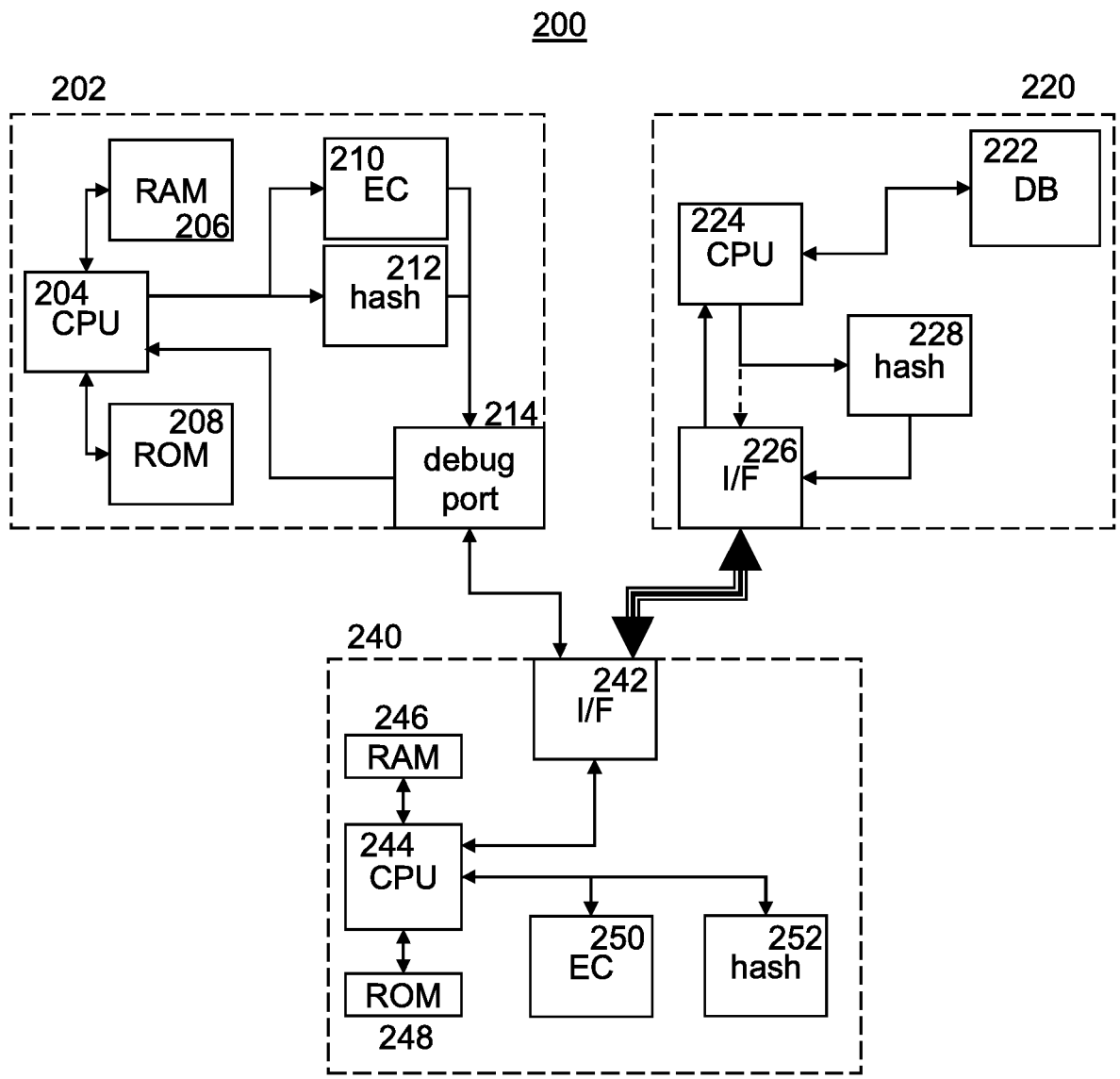
FIG. 2 is a schematic representation of an exemplary system.

FIG. 2 shows a schematic representation of an exemplary system 200 during use of the inventive method. A data processing apparatus 240 that is configured to perform the method presented with reference to FIG. 1 includes a communication interface 242 providing communication connections with a communication interface 214 of a device 202 under test and with a communication interface 226 of a database system 220. It is obvious that the communication connections need not be established permanently, or simultaneously. It is sufficient that the data processing apparatus is connected for receiving requested data blocks, and terminates the respective connection after receiving. The connection between data processing apparatus 240 and database system 220 may require or provide a stronger protection and may require particular authorisation and/or authentication for establishing or for certain data to be transmitted, as indicated by the style of the connecting line.

Device 202 under test, i.e., the device whose memory content is analysed for errors or modifications, further has a microprocessor 204 and associated memory 206, 208, and is configured to respond to requests to read out memory content by sending hash values of the requested content and/or corresponding error correction information, rather than the actual content. Microprocessor 204 may determine hash values and/or error correction information through corresponding software routines and/or hardware components 212, 210. Communication interface 214 may be an interface used for communication during normal operation of the device as well as during a diagnostic mode, or may be a dedicated port, e.g., a debug port.

Database system 220 includes a microprocessor 224 that receives read requests to reference memory blocks stored in a reference memory 222 via communication interface 226.

Microprocessor 224 is configured to retrieve the requested content of the blocks specified in the request, but may return only hash values of the content rather than the actual content. Microprocessor 224 may be configured to determine hash values through a corresponding software routine and/or hardware component 228. Such information would suffice to determine identity or non-identity of memory blocks of the device 202 and the corresponding reference memory blocks. The actual content may be returned by database system 220 only in response to a specific authentication and/or authorization of data processing apparatus 240.

Data processing apparatus 240 further comprises a microprocessor 244, associated RAM 246 and ROM 248, and a communication interface 242. Communication interface 242 may actually be a single interface or comprise multiple interfaces according to multiple communication standards and/or protocols. ROM 248 may store program instructions that, when executed by microprocessor 244, configure data processing apparatus 240 to perform the inventive method described with reference to FIG. 1. Hardware and/or software modules 250, 252 may be provided in data processing apparatus 240 for calculating error correction information or hash values.

It is readily apparent that no actual memory content is output by the device 202 under test at any time, irrespective of whether the access to the device is legit or malicious.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the terms "comprising" or "including" do not exclude other elements or steps, and the indefinite articles "a" or "an" do not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A computer-implemented method of identifying errors in data or software of a device or manipulations of the data or the software of the device, comprising:
  receiving a first hash value of data or software stored in a first block of a memory of the device;
  receiving a second hash value of the data or software in the first block from a reference memory or receiving content of the first block from the reference memory and determining the second hash value,
  wherein only a hash value is received for memory blocks of restricted memory ranges and respective content of memory blocks that do not lie in the restricted memory ranges; and
  comparing the first hash value and the second hash value;
  in case the first and second hash values are identical:
    repeating the preceding steps for data or software stored in a different block;
    generating and outputting a first signal indicating an identity of the data or software stored in the first block of the memory of the device and the data or software stored in the first block of the reference memory and/or terminating the method,
  in case the first and second data are different:
    generating and outputting a second signal indicating non-identity of the data or the software stored in the first block of the memory of the device and the data or software stored in the first block of the reference memory;

receiving or extracting error correction information for the first block stored in the memory of the device;
receiving the content of the first block from the reference memory if the content has not already been received for determining the second hash value;
reconstructing the content of the first block stored in the memory of the device by iteratively:
modifying the content of the first block received from the reference memory in accordance with the received error correction information;
generating a hash value of the modified content;
comparing the hash value of the modified content with the received first hash value;
repeating the preceding iterative steps until the hash value of the modified content and the received first hash value are identical;
identifying those parts of the reference content of the block that are likely unchanged and those that are likely to have been modified; and
comparing the content of the first block received from the reference memory and the content of the reconstructed first block stored in the memory of the device for identifying differences in the content.

2. The method of claim 1, wherein receiving the first hash value comprises:
establishing a communication with a communication interface of the device;
transmitting a read request specifying the first block to a communication interface of the device, targeted to return the content of the first block, and/or
wherein receiving the second hash value comprises:
establishing a communication with a communication interface of a database, separate from the device; and
transmitting a read request specifying the first block to a communication interface of the database, targeted to return the content of the first block or the corresponding second hash value.

3. The method of claim 1, wherein a begin address and/or an end address of a respective block are iteratively modified for isolating an address range in the memory of the device that is different from the corresponding address range in the reference memory.

4. The method of claim 1, wherein the content of the first block is received from the reference memory only after sending valid authentication and/or authorization information to an access control entity associated with the reference memory.

5. The method of claim 1, wherein carrying out the iterative modification includes exploiting known patterns or properties of the content of the block.

6. The method of claim 1, further including, in case the first block contains computer program instructions:
decompiling the reconstructed first block stored in the memory of the device, for obtaining a human-intelligible representation of the computer program instructions.

7. A device comprising:
a microprocessor;
associated memory; and
a communication interface,
wherein the device is configured to receive, via the interface and from an external entity that is not part of the device, an external read request specifying a block of the associated memory of the device,
wherein the device is further configured to:
return, in response to the external read request, a first hash value of the content of the specified memory block;
receiving a second hash value of the data or software in the first block from a reference memory or receiving content of the first block from the reference memory and determining the second hash value,
wherein only a hash value is received for memory blocks of restricted memory ranges and respective content of memory blocks that do not lie in the restricted memory ranges; and
comparing the first hash value and the second hash value;
in case the first and second data are different:
generating and outputting a signal indicating non-identity of the data or the software stored in the first block of the memory of the device and the data or software stored in the first block of the reference memory;
receiving or extracting error correction information for the first block stored in the memory of the device;
receiving the content of the first block from the reference memory if the content has not already been received for determining the second hash value;
identifying those parts of the reference content of the block that are likely unchanged and those that are likely to have been modified; and
iteratively reconstructing the content of the first block stored in the memory of the device.

8. The device of claim 7, further configured to generate and return, in response to a corresponding read request specifying a block of memory of the device, error correction information for the content of the specified memory block.

9. The device of claim 7, further configured to return hash values of the content of a specified block of the memory only for requests to a specific memory address range.

10. A database system comprising:
a data storage storing reference copies of data or software stored in the memory of a device comprising:
a microprocessor;
associated memory; and
a communication interface,
wherein the device is configured to receive, via the interface and from an external entity that is not part of the device, an external read request specifying a block of the associated memory of the device,
wherein the device is further configured to return, in response to the external read request, a first hash value of the content of the specified memory block,
a microprocessor having read access to the data storage storing the reference copies of the data or the software stored in the memory of the device,
wherein the database system is configured to receive, via a communication interface and from an entity that is not part of the database system, an external first read request specifying a block of data or software of a device,
wherein the database system is further configured to only return a hash value of the content of the specified block in response to the first read request for memory blocks of specific restricted memory ranges and return content of memory blocks that do not lie in the restricted memory ranges,
wherein the database system is configured to receive an external second read request specifying a block of data or software of a device,
wherein the database system is further configured to:
return the content of the specified block in response to the second read request, identifying those parts of the reference content of the block that are likely unchanged and those that are likely to have been modified, and for those that are likely to have been modified a begin address and/or an end address of the block may be modified, by being shifted to a lower or a higher value.

11. The database system of claim 10, further including access control elements and configured to return the hash value only after a positive first authentication and/or first authorisation.

12. The database system of claim 10, further configured to return, after a positive second authentication and/or authorisation, a representation of the content of the memory block specified in the request.

13. A data processing apparatus for identifying errors in or manipulations of data or software used or executed by a microprocessor for controlling a device, the data processing apparatus comprising:

a microprocessor and associated memory; and one or more interfaces configured to communicatively connect with a database system storing a reference copy of the data or the software of the device and for communicatively connecting with the device, wherein the microprocessor executes instructions that cause the data processing apparatus to carry out the method of claim 1.

14. A computer program product comprising instructions which, when the program is executed by a computer, cause the computer to:

receive a first hash value of data or software stored in a first block of a memory of the device;

receive a second hash value of the data or software in the first block from a reference memory or receiving the content of the first block from the reference memory and determining the second hash value, wherein only a hash value is received for memory blocks of restricted memory ranges and respective content of memory blocks that do not lie in the restricted memory ranges; and compare the first hash value and the second hash value;

in case the first and second hash values are identical:

repeat the preceding steps for data or software stored in a different block;

generate and output a first signal indicating an identity of the data or software stored in the first block of the memory of the device and the data or software stored in the first block of the reference memory and/or terminating the method, in case the first and second data are different:

generate and output a second signal indicating non-identity of the data or the software stored in the first block of the memory of the device and the data or software stored in the first block of the reference memory;

receive or extract error correction information for the first block stored in the memory of the device;

receive the content of the first block from the reference memory if the content has not already been received for determining the second hash value;

reconstruct the content of the first block stored in the memory of the device by iteratively:

modify the content of the first block received from the reference memory in accordance with the received error correction information;

generate a hash value of the modified content;

compare the hash value of the modified content with the received first hash value;

repeat the preceding iterative steps until the hash value of the modified content and the received first hash value are identical;

identifying those parts of the reference content of the block that are likely unchanged and those that are likely to have been modified; and compare the content of the first block received from the reference memory and the content of the reconstructed first block stored in the memory of the device for identifying differences in the content.

15. A computer-readable data storage medium comprising instructions which, when executed by a computer, cause the computer to:

receive a first hash value of data or software stored in a first block of a memory of the device;

receive a second hash value of the data or software in the first block from a reference memory or receiving the content of the first block from the reference memory and determining the second hash value, wherein only a hash value is received for memory blocks of restricted memory ranges and respective content of memory blocks that do not lie in the restricted memory ranges; and compare the first hash value and the second hash value;

in case the first and second hash values are identical:

repeat the preceding steps for data or software stored in a different block;

generate and output a first signal indicating an identity of the data or software stored in the first block of the memory of the device and the data or software stored in the first block of the reference memory and/or terminating the method, in case the first and second data are different:

generate and output a second signal indicating non-identity of the data or the software stored in the first block of the memory of the device and the data or software stored in the first block of the reference memory;

receive or extract error correction information for the first block stored in the memory of the device;

receive the content of the first block from the reference memory if the content has not already been received for determining the second hash value;

reconstruct the content of the first block stored in the memory of the device by iteratively:

modify the content of the first block received from the reference memory in accordance with the received error correction information;

generate a hash value of the modified content;

compare the hash value of the modified content with the received first hash value;

repeat the preceding iterative steps until the hash value of the modified content and the received first hash value are identical;

identifying those parts of the reference content of the block that are likely unchanged and those that are likely to have been modified; and compare the content of the first block received from the reference memory and the content of the reconstructed first block stored in the memory of the device for identifying differences in the content.

* * * * *